(12) United States Patent
Liljenstolpe

(10) Patent No.: US 9,584,340 B2
(45) Date of Patent: *Feb. 28, 2017

(54) DATA CENTER NETWORKS

(71) Applicant: Tigera, Inc., San Francisco, CA (US)

(72) Inventor: Christopher David Liljenstolpe, San Francisco, CA (US)

(73) Assignee: Tigera, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,556

(22) Filed: May 3, 2016

(65) Prior Publication Data

US 2016/0248602 A1 Aug. 25, 2016

Related U.S. Application Data

(63) Continuation of application No. 14/231,631, filed on Mar. 31, 2014, now Pat. No. 9,344,364.

(51) Int. Cl.
| | |
|---|---|
| *H04L 12/713* | (2013.01) |
| *H04L 12/46* | (2006.01) |
| *H04L 12/747* | (2013.01) |
| *H04L 12/56* | (2006.01) |
| *H04L 12/801* | (2013.01) |
| *H04L 12/66* | (2006.01) |
| *H04L 12/751* | (2013.01) |
| *H04L 29/12* | (2006.01) |
| *H04L 29/08* | (2006.01) |

(52) U.S. Cl.
CPC .......... *H04L 12/4641* (2013.01); *H04L 12/66* (2013.01); *H04L 45/02* (2013.01); *H04L 45/586* (2013.01); *H04L 45/741* (2013.01); *H04L 45/742* (2013.01); *H04L 47/10* (2013.01); *H04L 61/103* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 5,999,514 | A * | 12/1999 | Kato | H04Q 11/0478 370/231 |
| 6,760,775 | B1 * | 7/2004 | Anerousis | H04L 29/06 709/229 |
| 6,963,926 | B1 * | 11/2005 | Robinson | H04L 45/10 370/389 |
| 7,269,157 | B2 * | 9/2007 | Klinker | H04L 12/5695 370/228 |

(Continued)

FOREIGN PATENT DOCUMENTS

WO 2013078979 A1 6/2013

*Primary Examiner* — Bunjob Jaroenchonwanit
(74) *Attorney, Agent, or Firm* — Van Pelt, Yi & James LLP

(57) ABSTRACT

Measures for establishing connectivity in a data center network are provided. A virtual connection is created between a virtual system hosted on a server in a data center network, and a packet forwarding function in that server. Additionally, an entry is populated in a packet forwarding data store in the server, which includes an internet protocol (IP) address of the virtual system and an associated identifier for the created virtual connection. The packet forwarding data store is accessed by the packet forwarding function when making forwarding decisions for received data packets.

35 Claims, 12 Drawing Sheets

(56) References Cited

U.S. PATENT DOCUMENTS

| | | | |
|---|---|---|---|
| 7,274,704 B1* | 9/2007 | Ould-Brahim | H04L 12/4641 370/254 |
| 7,324,526 B1* | 1/2008 | Kulkarni | H04L 12/5601 370/397 |
| 7,471,680 B1* | 12/2008 | Morrow | H04L 45/00 370/392 |
| 7,583,665 B1* | 9/2009 | Duncan | H04Q 11/0478 370/389 |
| 7,715,380 B2* | 5/2010 | Somasundaram | H04L 12/4675 370/389 |
| 7,822,027 B2* | 10/2010 | Yadav | H04L 45/02 370/254 |
| 8,141,156 B1* | 3/2012 | Mao | H04L 45/021 709/223 |
| 8,693,344 B1 | 4/2014 | Adams et al. | |
| 8,804,747 B2* | 8/2014 | Galles | H04L 47/10 370/399 |
| 2002/0186698 A1* | 12/2002 | Ceniza | H04L 12/4641 370/401 |
| 2003/0055985 A1 | 3/2003 | Corb et al. | |
| 2003/0118001 A1* | 6/2003 | Prasad | H04L 12/24 370/352 |
| 2006/0140194 A1* | 6/2006 | Monette | H04L 12/6402 370/400 |
| 2006/0282887 A1* | 12/2006 | Trumper | H04L 63/20 726/11 |
| 2007/0177548 A1 | 8/2007 | Oyama et al. | |
| 2007/0263660 A1* | 11/2007 | Mitsumori | H04L 12/467 370/469 |
| 2008/0077690 A1* | 3/2008 | Miyajima | G06F 9/5088 709/226 |
| 2008/0107117 A1* | 5/2008 | Kulkarni | H04L 12/5601 370/395.2 |
| 2009/0041037 A1* | 2/2009 | Yang | H04L 45/02 370/401 |
| 2009/0154357 A1* | 6/2009 | Pacella | H04L 43/0811 370/237 |
| 2009/0198817 A1* | 8/2009 | Sundaram | H04L 29/12301 709/227 |
| 2009/0296714 A1* | 12/2009 | Gerber | H04L 12/4641 370/395.31 |
| 2010/0049968 A1* | 2/2010 | Dimitrakos | H04L 63/0807 713/153 |
| 2010/0054120 A1* | 3/2010 | Beeken | G06F 11/1484 370/221 |
| 2010/0107162 A1 | 4/2010 | Edwards et al. | |
| 2010/0214949 A1* | 8/2010 | Smith | H04L 45/586 370/254 |
| 2010/0223397 A1* | 9/2010 | Elzur | H04L 41/0213 709/235 |
| 2010/0322255 A1* | 12/2010 | Hao | G06F 9/45558 370/398 |
| 2011/0019551 A1* | 1/2011 | Adams | H04L 43/026 370/235 |
| 2011/0064083 A1* | 3/2011 | Borkenhagen | H04L 45/02 370/392 |
| 2011/0082941 A1* | 4/2011 | Kim | H04L 12/2859 709/227 |
| 2011/0103389 A1* | 5/2011 | Kidambi | H04L 45/586 370/395.1 |
| 2011/0106959 A1* | 5/2011 | Suciu | H04W 36/0011 709/230 |
| 2011/0113472 A1* | 5/2011 | Fung | H04L 63/102 726/3 |
| 2011/0261828 A1 | 10/2011 | Smith | |
| 2011/0283017 A1* | 11/2011 | Alkhatib | H04L 12/4641 709/244 |
| 2011/0317703 A1 | 12/2011 | Dunbar et al. | |
| 2012/0079478 A1* | 3/2012 | Galles | H04L 47/2441 718/1 |
| 2012/0093154 A1* | 4/2012 | Rosenberg | H04L 45/04 370/392 |
| 2012/0117566 A1* | 5/2012 | Maeda | G06F 21/53 718/1 |
| 2012/0207160 A1* | 8/2012 | Yadav | H04L 12/1886 370/390 |
| 2012/0287930 A1* | 11/2012 | Raman | H04L 45/02 370/392 |
| 2012/0311673 A1* | 12/2012 | Sodah | G06F 21/6218 726/4 |
| 2013/0086236 A1* | 4/2013 | Baucke | H04L 45/50 709/223 |
| 2013/0174150 A1 | 7/2013 | Nakajima | |
| 2013/0174151 A1 | 7/2013 | Nakajima | |
| 2013/0205376 A1 | 8/2013 | Narasimha et al. | |
| 2013/0259052 A1 | 10/2013 | Akiyosh | |
| 2013/0268588 A1* | 10/2013 | Chang | H04L 12/6418 709/204 |
| 2013/0322446 A1* | 12/2013 | Biswas | H04L 12/4633 370/392 |
| 2013/0322453 A1* | 12/2013 | Allan | H04L 12/4662 370/395.53 |
| 2014/0098813 A1* | 4/2014 | Mishra | H04L 12/185 370/390 |
| 2014/0098815 A1 | 4/2014 | Mishra et al. | |
| 2014/0160984 A1 | 6/2014 | Hallivuori | |
| 2014/0341019 A1 | 11/2014 | Yamagata et al. | |
| 2014/0351371 A1* | 11/2014 | Smith | H04L 45/64 709/217 |
| 2014/0351452 A1* | 11/2014 | Bosch | H04L 67/10 709/242 |
| 2015/0055571 A1* | 2/2015 | Vesterinen | H04L 61/2092 370/329 |
| 2015/0117445 A1* | 4/2015 | Koponen | H04L 41/0896 370/389 |
| 2015/0124608 A1* | 5/2015 | Agarwal | H04L 47/122 370/235 |
| 2015/0163162 A1* | 6/2015 | DeCusatis | H04L 43/08 709/224 |

* cited by examiner

DATA CENTER NETWORKS

CROSS-REFERENCE TO RELATED APPLICATIONS

This application is a continuation of U.S. application Ser. No. 14/231,631, filed Mar. 31, 2014. The above-referenced patent application is incorporated by reference in its entirety.

BACKGROUND OF THE INVENTION

Field of the Invention

The present application relates to data center networks. In particular, but not exclusively, the present application relates to connectivity and security in data center networks.

Description of the Related Technology

Data center deployments, including cloud computing environments, typically provide a computational resource in the form of a number of servers, which can be utilized for various computational tasks, such as data processing, file serving, application hosting and provision telecommunications services. Such servers are typically comprised within a data center network which interconnects the various servers in the data center deployment and facilitates communication between them. Commonly, the data center network will take the form of a local area network (or LAN), which is deployed at a data center facility which houses the various servers and other necessary hardware required for the data center deployment.

More recently, particularly in cloud computing environments, a data center deployment may include servers at different geographic locations. Such deployments may be referred to as distributed data centers. A distributed data center network may provide geographical redundancy to the data center deployment, such that a disruption or failure at a particular data center facility does not result in a loss of service, as the required computation can be provided by servers at other data center facilities in the data center network.

The computational resource provided by a data center may be utilized in various ways. In one variety of architecture, each server in a data center may have a dedicated function or set of functions to perform. However, this can result in poor scalability and inefficient hardware-resource utilization because some functions in the data center network may not utilize all of the hardware resources that have been allocated. To address this, virtualization techniques have been developed which allow a virtual system (or 'guest') to be created and deployed on a real, physical machine (or 'host') such as a server. Varieties of known guest virtual systems include virtual machines, as well as virtual environments (such as Linux Containers; LXC). The virtual system then behaves as if it were an independent machine or environment with a defined function or set of functions to perform.

One of the advantages that use of virtualization can provide in data center networks is that multiple guests can be deployed on a single host, with each guest sharing the available hardware resources of the host machine, but operating potentially independently of each other. If the guests running on a particular host are not making efficient use of the computational resource of the host machine (i.e. there is a significant amount of spare capacity available on the host), then an extra guest can be added to the host. Similarly, if the guests running on a particular machine require more combined computational resource than the host machine can provide, then one or more of the guests can be moved to a different host machine in the data center network. Additionally, if the overall demand on the data center network (or on a particular function in the data center network) increases, this demand can be met by setting up additional guests (either by utilizing spare capacity on one of the host machines in the data center network or by adding extra hosts to the data center network).

The guest virtual systems in a data center deployment may be virtualized as separate communication endpoints in the data center network (which may be configured as a local area network, or LAN, for example). In such deployments, each host server may act as a switch to pass data packets to and from the guests that it hosts. Typically, data center networks operate according to the Internet Protocol (IP) suite. According to the internet protocol, such switching within a particular network (e.g. a LAN) is performed on the basis of a destination media access control (MAC) address specified in the data packet. In terms of the open systems interconnection (OSI) model, such MAC addressed based switching is considered to take place at "Layer 2". In this way, all of the guests in the data center network are conceptually located in the same network.

In some data center deployments, all of the guests may belong to the same enterprise (or 'tenant'). Such deployments are known as single tenant data centers. Alternatively, so called multi-tenant data centers may include guests belonging to several different tenants. In order to provide segregation between the virtual systems of different tenants, e.g. for information security or conflict avoidance reasons, a number of virtual LANs may be configured in the network which provide connectivity between the various virtual systems associated with a given tenant, but not to virtual systems associated with different tenants.

SUMMARY

According to a first embodiment, there is provided a method for establishing connectivity in a data center network, the method comprising: creating a virtual connection between a virtual system hosted on a server in the data center network, and a packet forwarding function comprised within the server; and populating an entry in a packet forwarding data store comprised within the server, the entry comprising an internet protocol (IP) address of the virtual system and an associated identifier for the created virtual connection, wherein the packet forwarding data store is accessed by the packet forwarding function when making forwarding decisions for received data packets.

According to a second embodiment, there is provided apparatus for use in a data center network, the apparatus comprising at least one processor, and at least one memory including computer program code, the at least one memory and the computer program code being configured to, with the at least one processor, cause the apparatus at least to: create a virtual connection between a virtual system hosted on a server in the data center network, and a packet forwarding function comprised within the server; and populate an entry in a packet forwarding data store comprised within the server, the entry comprising an internet protocol (IP) address of the virtual system and an associated identifier for the created virtual connection, wherein the packet forwarding data store is accessed by the packet forwarding function when making forwarding decisions for received data packets.

According to a third embodiment, there is provided computer program product comprising a non-transitory computer-readable storage medium having computer readable instructions stored thereon, the computer readable instructions being executable by a computerized device to cause the computerized device to perform the method of the first embodiment of the application.

Embodiments comprise a computer program product (for example computer software) adapted to perform the method of the first embodiment of the present application.

Further features and advantages of the application will become apparent from the following description of preferred embodiments of the application, given by way of example only, which is made with reference to the accompanying drawings.

DETAILED DESCRIPTION OF CERTAIN INVENTIVE EMBODIMENTS

Figure 1:
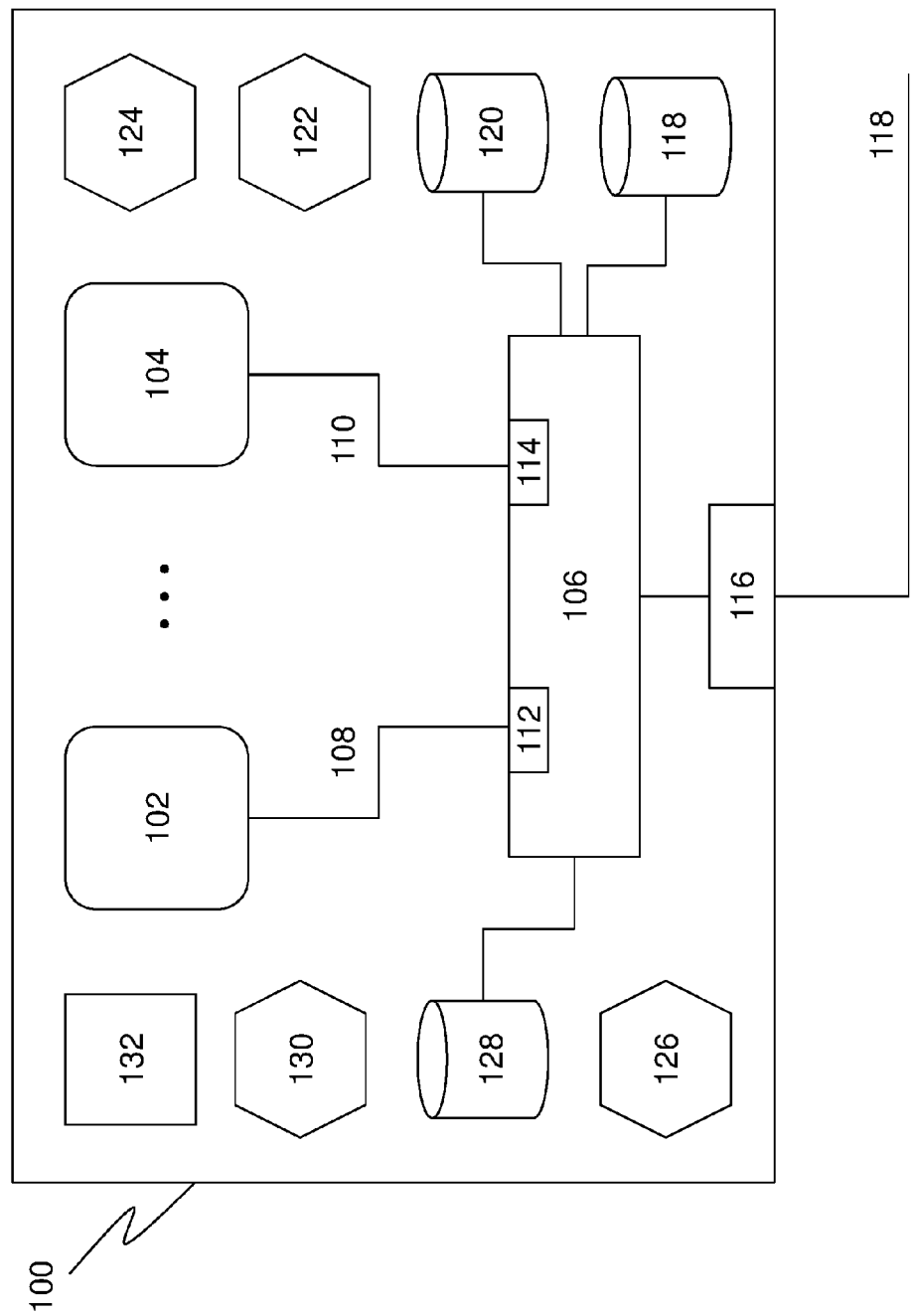
FIG. 1 illustrates an apparatus according to one or more disclosed embodiments.

In some embodiments disclosed herein, a packet forwarding function is provided in a server in a data center network. The packet forwarding function is configured to behave as a virtualized router for forwarding data packets between one or more virtual systems hosted on the server and the rest of the data center network FIG. 1 illustrates an apparatus 100 according to certain embodiments. In the depicted embodiments, apparatus 100 may comprise a server. In alternative embodiments, apparatus 100 may be a hardware module comprised within a server in the data center network, for example a server blade or other hardware component. Server 100 is configured to host one or more virtual systems, including virtual system 102. In the depicted embodiments, server 100 further hosts virtual system 104. In alternative embodiments, server 100 may host a single virtual system (e.g. 102), or may host more than the two illustrated virtual systems. Through hosting the one or more virtual systems 102, 104, server 100 can be considered to comprise the one or more virtual systems 102, 104.

Server 100 may further comprise packet forwarding function 106, which is configured to forward data packets that may be routed to and/or from the one or more virtual systems 102, 104 hosted on server 100. Packet forwarding function 106 may be configured to make forwarding decisions for received data packets on the basis of the destination IP address of the received data packet. Packet forwarding function 106 can be considered to behave as a virtualized router within server 100. By making forwarding decisions for received packets on the basis of the destination IP address, the packet forwarding function can be considered to operate at "Layer 3" of the OSI model.

Providing a virtualized routing function within server 100 to route data packets to and/or from the virtual systems hosted on server 100 may serve to enable more efficient scaling in data center networks. Compared to conventional mechanisms which employ "Layer 2" MAC address based switching to forward data packets to and/or from virtual systems hosted on a particular server, the use of IP addresses to make forwarding decisions enables the data center network to be segregated into a number of separate networks, therefore facilitating an arbitrarily large number of virtual systems to be incorporated into the network.

In contrast, using conventional Layer 2 switching for forwarding data packets to and/or from virtual systems hosted on a particular server results in scaling difficulties. Layer 2 switching protocols suffer inefficiencies when the network has a large total number of endpoints or distributed over relatively large geographic areas. This is due to the inability to aggregate Layer 2 forwarding information, and the relatively simplistic design of the Layer 2 control plane protocols.

In some embodiments, the one or more virtual systems 102, 104 may comprise virtual machines. Server 100 may host the one or more virtual machines through use of a virtualization tool such as a hypervisor. In such embodiments, a hypervisor may run on top of an existing operating system on the server 100, or it may run directly on the server hardware without an intermediate operating system (in a so called 'bare metal' configuration). In some embodiments, the hypervisor (not shown) may comprise packet forwarding function 106. In some embodiments, a software tool such as OpenStack™ may be used to run the virtual machines on server 100. In further embodiments, the one or more virtual systems 102, 104 may comprise virtual environments, such as 'containers'. In some such embodiments, server 100 is configured with a Linux kernel, and may host the one or more virtual systems through the use of the virtualization tool Linux Containers (LXC).

The one or more virtual systems 102, 104 may be configured to connect to packet forwarding function 106 via respective virtual connections 108, 110. In some embodiments, the virtual connections 108, 110 may comprise virtual Ethernet connections. In embodiments, packet forwarding function 106 may comprise one or more virtual interfaces 112, 114, with each virtual connection 108, 110 being connected to packet forwarding function 106 via a respective virtual interface 112, 114. In some embodiments, the one or more virtual ports may comprise virtual Ethernet ports. In further embodiments, the one or more virtual ports may comprise network tunnel connections. In yet further embodiments, the one or more virtual ports may comprise network tap connections. In some embodiments, packet forwarding function 106 is comprised within a Linux kernel running on server 100, and the one or more virtual systems 102, 104 running on the server are connected via virtual connections 108, 110 to virtual interface 112, 114 in the Linux kernel.

In some embodiments, server 100 includes a physical network interface 116, through which packet forwarding function 106 can send packets to and receive packets from entities in the data center network outside of server 100. In such embodiments, packet forwarding function 106 is responsible for forwarding data packets between the one or more virtual systems 102, 104 hosted on server 100 and the wider data center network, accessed via physical network interface 116 and physical network connection 118. In embodiments, the physical network interface may comprise one or more network interface cards (NIC). In embodiments, physical network connection 118 may comprise a part of a data center switching fabric for interconnecting one or more servers in the data center network.

The virtualized router arrangement of the present disclosure provides efficient means for forwarding data packets between the one or more virtual systems 102, 104 hosted on server 100 and the wider data center network via the physical network interface 116 and physical network connection 118. In contrast, known arrangements that are commonly used to forward data packets between guest virtual systems and the physical network interface of a host server commonly use "Layer 2" MAC address based switching and are necessarily highly complex in order to provide interoperability between the virtual systems and the physical network interface of the server. This high complexity may avoided through use of the virtualized router arrangement that is provided in embodiments of this application.

In some embodiments, the virtualized router arrangement provided by packet forwarding function 106 segregates the one or more virtual systems 102, 104 running on server 100 into a separate local network which is distinct from the remainder of the data center network. In embodiments, the one or more virtual systems 102, 104 running on server 100 are comprised within an "internal" network, which is in turn comprised within server 100. The internal network provides interconnection between the one or more virtual systems 102, 104 hosted on server 100 and packet forwarding function 106. A different, "external" network then provides interconnection between server 100 and one or more other servers in the data center network. Hence, packet forwarding function 106 can be considered to connect the internal network within server 100 to the external network. In some arrangements, the internal network comprised within server 100 can be considered to be a virtual network, because it exists within server 100 and may comprise virtual hardware, including virtual systems 102, 104.

By performing the function of a virtualized router, packet forwarding function 106 may have an IP address in the internal network that is different to the IP address that it has in the external network. The IP address of packet forwarding function 106 in the external network may be the same as an IP address of server 100 in the data center network. In contrast, the IP address of packet forwarding function 106 in the internal network comprised within server 100 is the IP address observed by virtual systems 102 and 104.

FIG. 1 also includes elements 118, 120, 122, 124, 126, 128, 130 and 132, the function of which will be explained later below.

Figure 2:
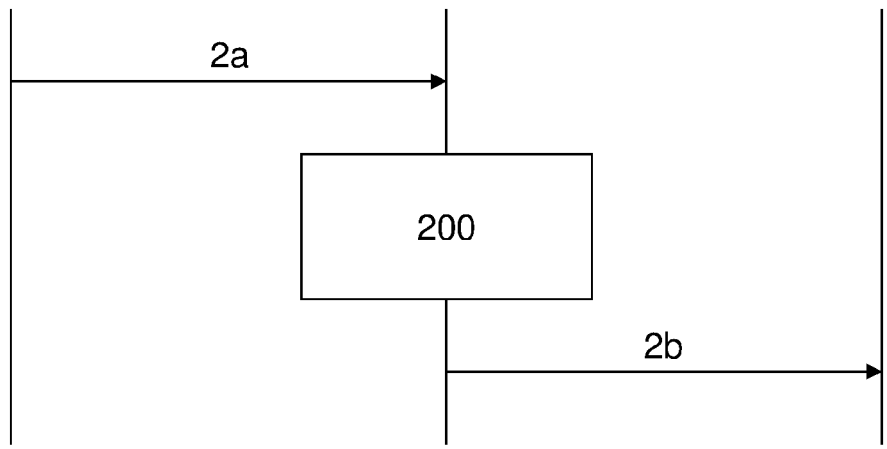
FIG. 2 illustrates an example message flow for a packet forwarding process according to one or more disclosed embodiments.

FIG. 2 illustrates an example message flow for a packet forwarding process according to embodiments. Initially data packet 2a is received at packet forwarding function 106 from the physical network interface 116 of server 100. Received data packet 2a may have originated from another server in the data center network, or another location external to server 100, such as the public internet. In response to receipt of data packet 2a, packet forwarding function 106 may be configured to make a forwarding decision for the received data packet on the basis of the destination IP address of the received data packet at step 200. In FIG. 2, the received data packet has the IP address of virtual system 102 as the destination IP address. Therefore, the result of the forwarding decision made at step 200 is to forward the data packet to virtual system 102 as forwarded data packet 2b. Forwarded data packet 2b is forwarded to virtual system 102 using virtual connection 108 via virtual interface 112.

Figure 3:
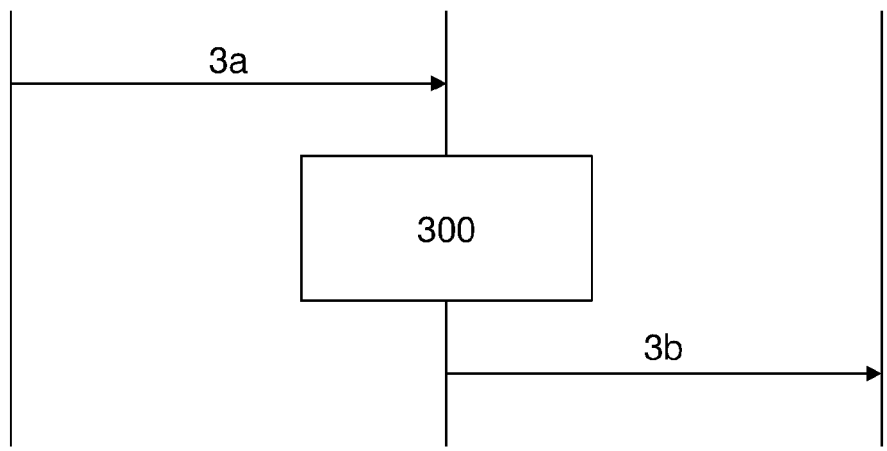
FIG. 3 illustrates an example message flow for a packet forwarding process according to one or more disclosed embodiments.

FIG. 3 illustrates an example message flow for a packet forwarding process according to embodiments. Initially, data packet 3a is received at packet forwarding function 106 from a virtual system hosted on server 100, in this case virtual system 102. Received data packet 3a is received from virtual system 102 over virtual connection 108 via virtual interface 112. In response to receipt of data packet 3a, packet forwarding function 106 may be configured to make a forwarding decision for the received data packet on the basis of the destination IP address of the received data packet at step 300. In FIG. 3, the received data packet has the IP address of an endpoint located outside of server 100 (i.e. not comprised in the internal network within server 100), such as another virtual system hosted on a different server in the data center network, or another location external to server 100, such as in the public Internet. Therefore, the result of the forwarding decision made at step 300 is to forward the data packet into the external network, via the physical network interface 116 of server 100, as forwarded data packet 3b.

Figure 4:
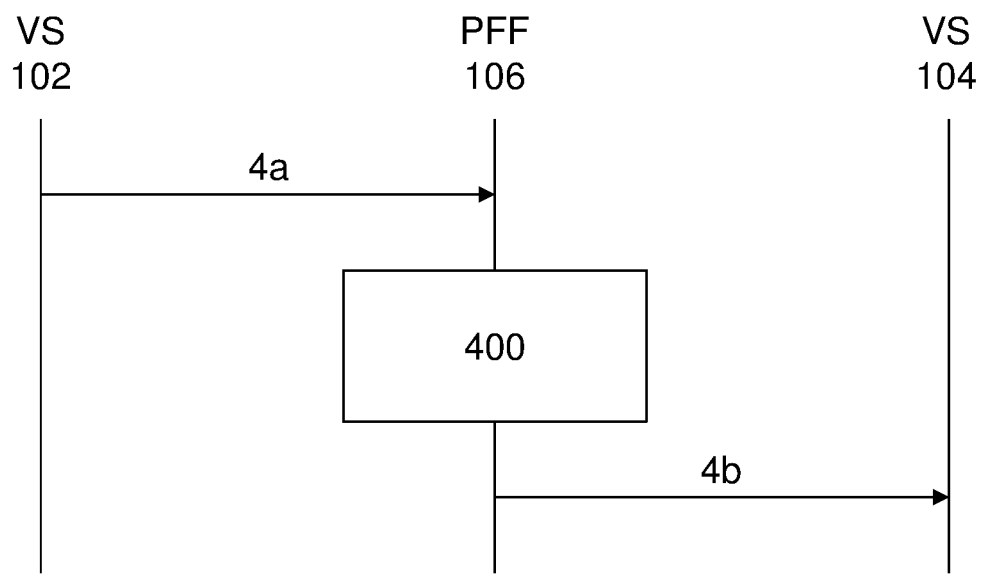
FIG. 4 illustrates an example message flow for a packet forwarding process according to one or more disclosed embodiments.

FIG. 4 illustrates an example message flow for a packet forwarding process according to embodiments. Initially data packet 4a is received at packet forwarding function 106 from a virtual system 104 hosted on server 100. In response to receipt of data packet 4a, packet forwarding function 106 may be configured to make a forwarding decision for the received data packet on the basis of the destination IP address of the received data packet at step 400. In FIG. 4, the received data packet has the IP address of another virtual system hosted on server 100 as the destination IP address, in this case virtual system 104. Therefore, the result of the forwarding decision made at step 400 is to forward the data packet to virtual system 104 as forwarded data packet 4b. Forwarded data packet 4b is forwarded to virtual system 104 using virtual connection 110 via virtual interface 114.

In some embodiments, data packets are routed from the one or more virtual systems 102, 104 hosted on server 100, to packet forwarding function 106 as a result of the IP address of packet forwarding function 106 in the internal network comprised within server 100 may be advertised as the default route for data packets originating in that internal network. This default route setup configures the one or more virtual systems hosted on server 100 to transmit outgoing data packets to the packet forwarding function, which is then equipped to make forwarding decisions for the received data packets. Hence, in some embodiments, received data packets 3a, 4a are received on the basis of this default route configuration.

In embodiments, such a default route setup may be achieved by configuring packet forwarding function 106 to respond to address resolution request messages with the media access control (MAC) address of the packet forwarding function 106 in the internal network comprised within sever 100. Setting up the packet forwarding function as the default route in this manner enables virtual systems 102, 104 to be setup on server 100 without requiring customized configuration of the virtual system which is specific to the server 100 on which it is hosted for the virtual system 102, 104 to be able to communicate.

Figure 5:
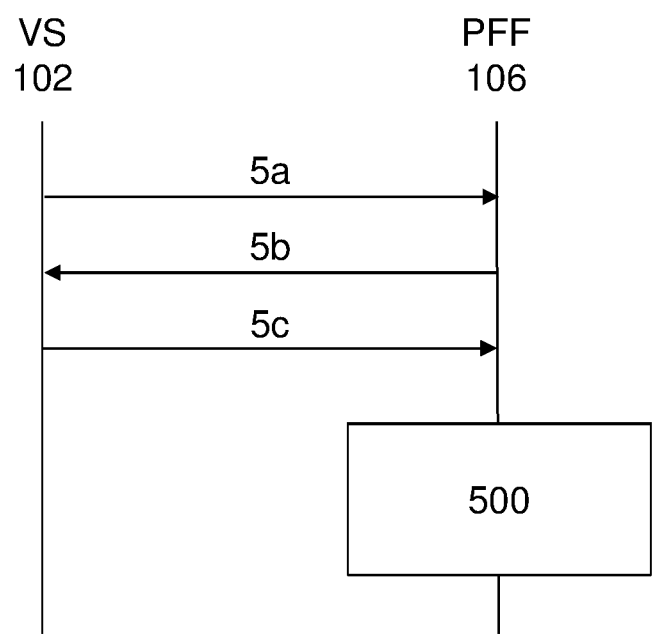
FIG. 5 illustrates an example message flow for a packet forwarding process according to one or more disclosed embodiments.

FIG. 5 illustrates an example message flow for an address resolution process according to embodiments. Initially, virtual system 102 hosted on server 100 has an outgoing data packet to transmit to a given destination IP address. In order to transmit the outgoing data packet, virtual system 102 first transmits address query message 5a in relation to the destination IP address. In some embodiments, address query message 5a may comprise an address resolution protocol (ARP) (in the case of an Internet Protocol version 4 (IPv4) destination address) or Neighbor discovery (ND) message (in the case of an Internet Protocol version 6 (IPv6) destination address). Address query message 5a may be broadcast to devices within the internal network that are connected to virtual system 102, which in this case includes only packet forwarding function 106.

Packet forwarding function 106 may be configured to intercept the address query message 5a by not forwarding the message to any other devices within the internal network. In response to receipt of address query message 5a, packet forwarding function 106 is configured to respond by transmitting address response message 5b to virtual system 102, which includes the MAC address of packet forwarding function 106 in the internal network.

In response to receipt of the address response message 5b, virtual system 102 may be configured to transmit the data packet using the MAC address comprised within the received address response message 5b. Therefore, data packet 5c is transmitted from virtual system 102 to packet forwarding function 106. Data packet 5c is thus received at packet forwarding function 106 on the basis of the transmitted address response message 5b. In response to receipt of data packet 5c, packet forwarding function 106 may be configured to make a forwarding decision for the packet on the basis of the destination IP address of data packet 5c at step 500, for example as described previously in relation to any of FIGS. 2 to 4.

In some embodiments, packet forwarding function 106 may be configured to make forwarding decisions on the basis of one or more packet forwarding data entries maintained in packet forwarding data store 118. As illustrated in FIG. 1, in some embodiments, packet forwarding data store 118 is accessible to packet forwarding function 106 for use in making forwarding decisions for received data packets. In some embodiments, packet forwarding data store 118 includes entries that may comprise "next hop" IP addresses for various destination IP addresses. Each next hop IP address may be associated with a border gateway or routing entity via which the device associated with the destination IP address may be reached, or it may be the same as the destination IP address if the device associated with destination IP address is located in the same network. In some embodiments, packet forwarding data store 118 may comprise a forwarding information base (FIB), or forwarding table. By querying the packet forwarding data store 118, packet forwarding function 106 can determine the next hop IP address required to reach the destination IP address of a received data packet, and therefore make a forwarding decision as to how to forward the received data packet on that basis.

Figure 6:
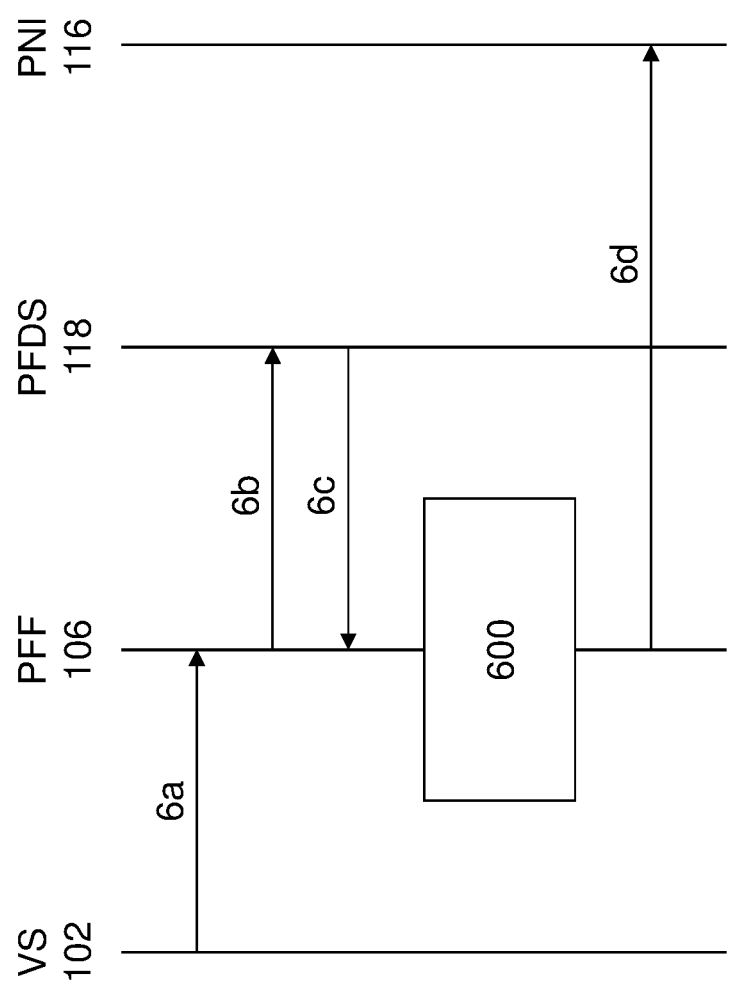
FIG. 6 illustrates an example message flow for a packet forwarding process according to one or more disclosed embodiments.

FIG. 6 illustrates an example message flow for a packet forwarding process according to embodiments. Initially, data packet 6a is received at packet forwarding function 106 from virtual system 102 (for example as a result of the default route configuration described above). In response to receipt of data packet 6a, packet forwarding function 106 may be configured to access packet forwarding data store 118 in relation to the destination IP address of received data packet 6a, through data store query 6b and corresponding data store response 6c. On the basis of the information comprised within data store response 6c, packet forwarding function 106 may be configured to make a forwarding decision for the received data packet as step 600. In the embodiments depicted in FIG. 6, data store response 6c may comprise a next hop IP address for use in routing the data packet towards the destination IP address. In this case, the next hop IP address is located externally to server 100, therefore packet forwarding function 106 makes a forwarding decision to forward the data packet to the retrieved next hop IP address, via the physical network interface 116, as forwarded data packet 6d.

In some embodiments, if the packet forwarding data store 118 does not include an entry that corresponds to the destination IP address of the received data packet, then the outcome of the forwarding decision is for the received data packet to be dropped by packet forwarding function 106 (i.e. not forwarded). In some embodiments, the packet forwarding data store 118 includes entries which comprise an interface identifier which identifies the appropriate interface 112, 114, 116 through which packets should be forwarded in order to reach various next hop IP addresses. In some such embodiments, the port through which a received data packet is forwarded by packet forwarding function 106 is determined on the basis of an interface identifier retrieved from packet forwarding data store 118, for example in data store response 6c. In such embodiments, the forwarding decisions made by packet forwarding function 106 are further based on the retrieved interface identifier.

In some embodiments, packet forwarding function 106 is configured to make forwarding decisions on the basis of one or more address translation data entries maintained in address translation data store 120. As illustrated in FIG. 1, in some embodiments, address translation data store 120 is accessible to packet forwarding function 106 for use in making forwarding decisions for received data packets. In some embodiments, packet forwarding data store 118 includes entries that may comprise a MAC address which corresponds to given IP addresses to which packets may be forwarded. In some embodiments, address translation data store 120 may comprise an ARP cache or ND cache. By querying the address translation data store 120, packet forwarding function 106 can determine the MAC address required to reach the IP address to which a received data packet is to be forwarded, and therefore make a forwarding decision as to how to forward the received data packet on that basis.

Figure 7:
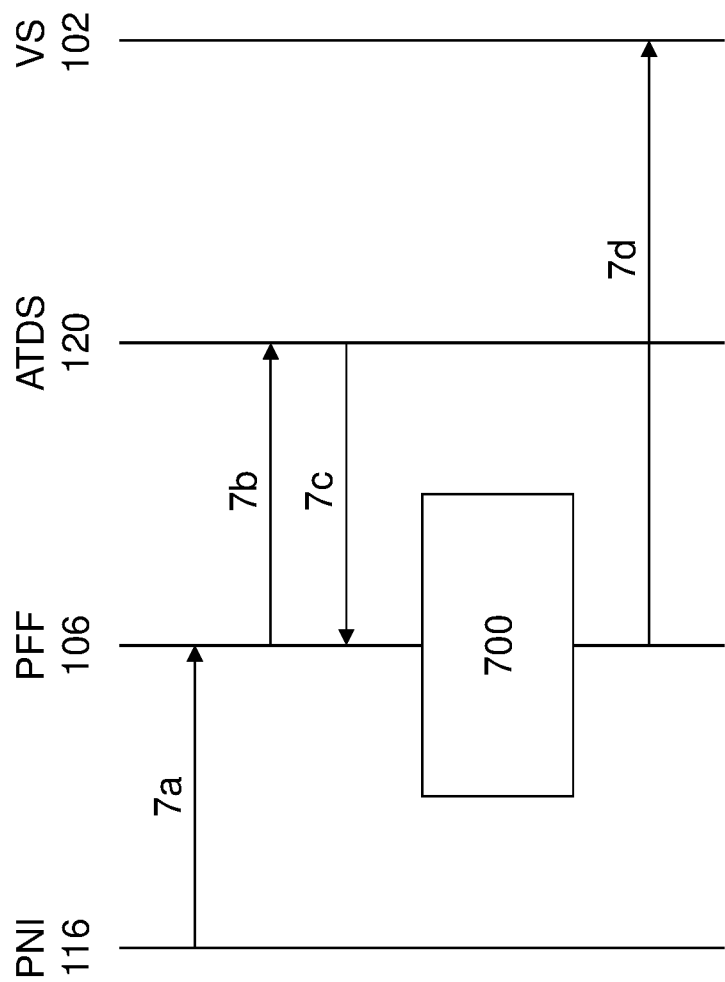
FIG. 7 illustrates an example message flow for a packet forwarding process according to one or more disclosed embodiments.

FIG. 7 illustrates an example message flow for a packet forwarding process according to embodiments. Initially, data packet 7a is received at packet forwarding function 106 via the physical network interface 116, with a destination IP address that is the IP address of virtual system 102. In response to receipt of data packet 7a, packet forwarding function 106 may be configured to access address translation data store 120 in relation to the IP address of virtual system 102, through data store query 7b and corresponding data store response 7c. On the basis of the information comprised within data store response 7c, packet forwarding function 106 may be configured to make a forwarding decision for the received data packet at step 700. In the embodiments depicted in FIG. 7, data store response 7c may comprise the MAC address of virtual system 102 for use in forwarding the received data packet to the destination IP address. Therefore, packet forwarding function 106 makes a forwarding decision to forward the data packet using the retrieved MAC address for virtual server 102, via virtual network interface 112, as forwarded data packet 7d.

Figure 8:
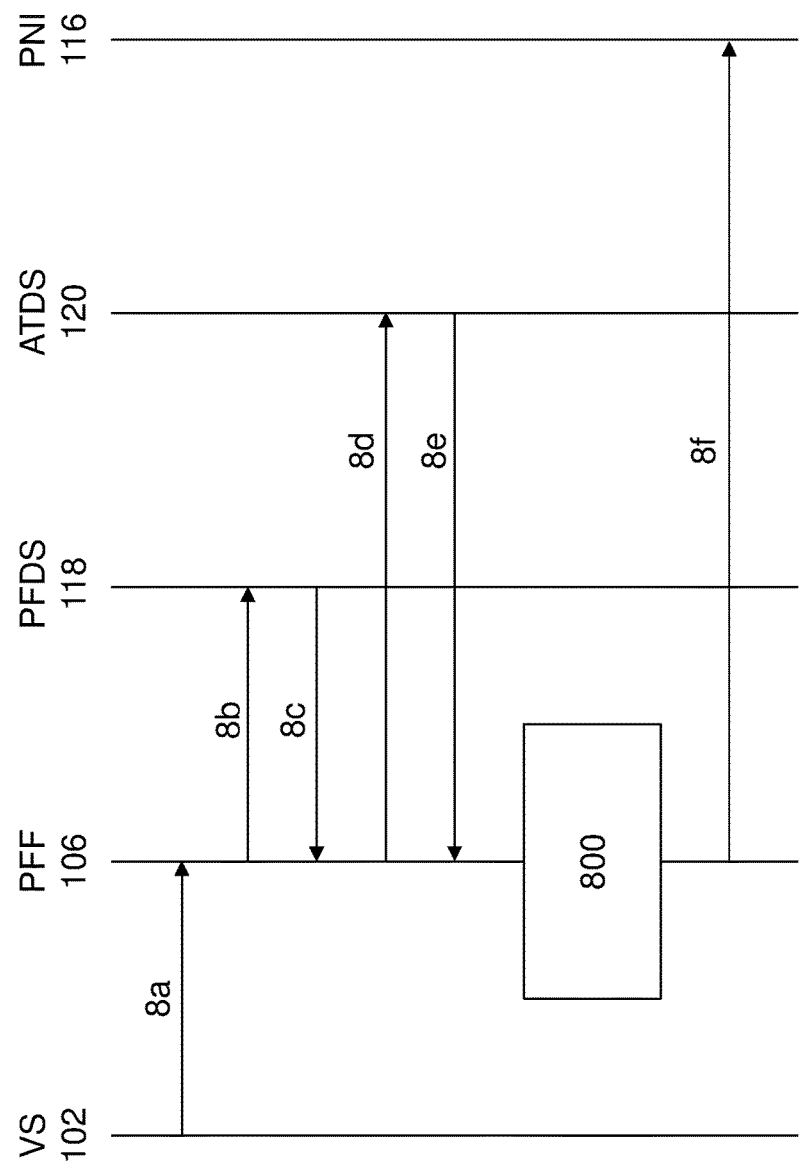
FIG. 8 illustrates an example message flow for a packet forwarding process according to one or more disclosed embodiments.

FIG. 8 illustrates an example message flow for a packet forwarding process according to embodiments. Initially, data packet 8a is received at packet forwarding function 106 from virtual system 102. In response to receipt of data packet 8a, packet forwarding function 106 may be configured to access packet forwarding data store 118 in relation to the destination IP address of received data packet 8a, through data store query 8b and corresponding data store response 8c. In the embodiments depicted in FIG. 8, data store response 8c may comprise a next hop IP address for use in routing the data packet towards the destination IP address. In this case, the next hop IP address is located externally to server 100, and is reachable via the physical network interface 116.

In response to determining the next hop IP address for the data packet, packet forwarding function 106 may be configured to access address translation data store 120 in relation to the next hop IP address, through data store query 8d and corresponding data store response 8e. In the embodiments depicted in FIG. 8, data store response 8e may comprise the MAC address of the device associated with the retrieved next hop IP address for the data packet. On the basis of the retrieved MAC address and next hop IP address, packet forwarding function 106 is configured to make a forwarding decision for the received data packet at step 800, which results in the data packet being forwarded to the next hop IP address, using the retrieved MAC address, via physical network interface 116, as forwarded data packet 8f.

Figure 9:
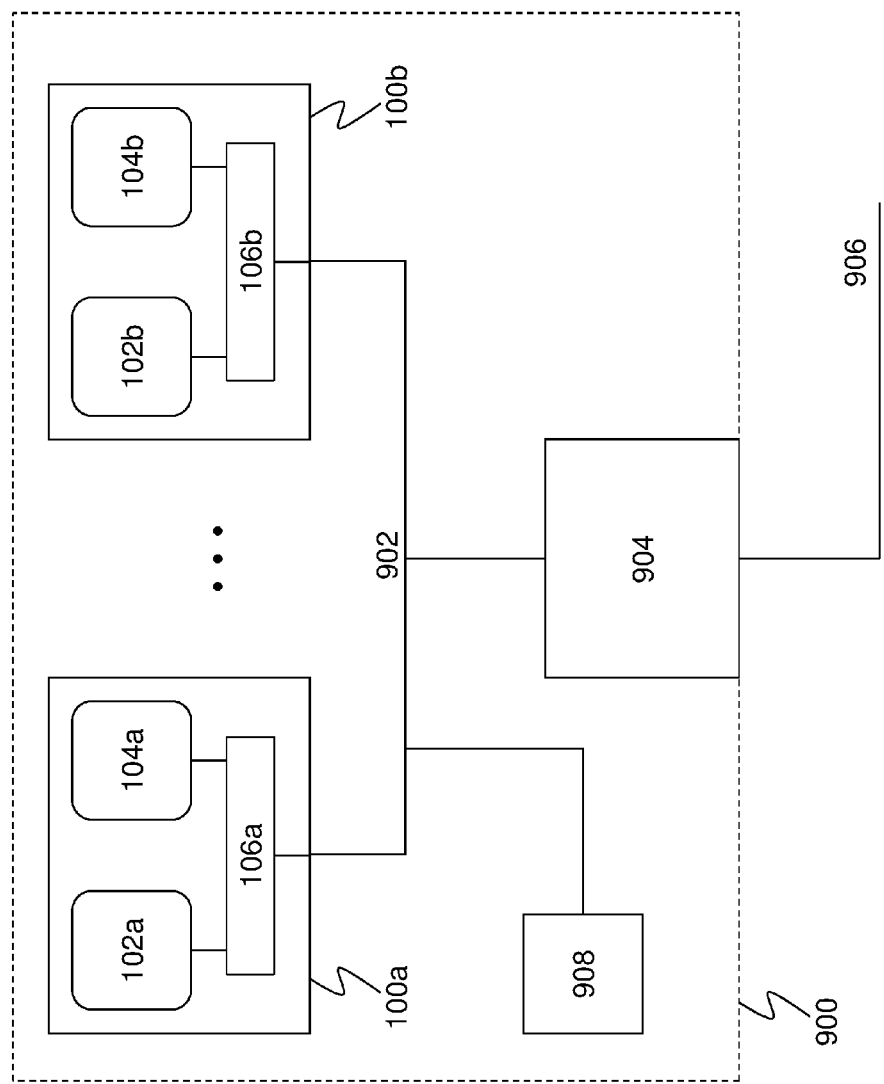
FIG. 9 illustrates an example data center network according to one or more disclosed embodiments.

FIG. 9 illustrates an example data center network 900 according to embodiments. In the embodiments depicted in FIG. 9, data center network 900 may comprise a plurality of servers (or server components) including at least server 100a and server 100b. In FIG. 9, many of the components of servers 100a and 100b have been omitted for clarity, however their structure and operation is similar to that described above in relation to FIG. 1. In the embodiments depicted in FIG. 9, only two servers 100a, 100b are shown, however, in further embodiments, more than two servers may be provided. Similarly, each of the depicted servers 100a, 100b is shown as comprising two virtual system 102a and 104a, and 102b and 104b respectively. However, in further embodiments, one or more of the servers 100a, 100b may comprise only one virtual system, or more than two virtual systems.

Packet forwarding function 106a connects the virtual systems 102a, 104a, on the internal network within server 100a to the external network, via the physical network interface of server 100a. In some embodiments, the external network may comprise the data center switching fabric 902, which interconnects the various physical machines in the data center network, including servers 100a and 100b. Similarly, packet forwarding function 106b connects the virtual systems 102b, 104b, on the internal network within server 100b to the external network (i.e. data center switching fabric 902), via the physical network interface of server 100b.

In embodiments, data center network 900 also may comprise border gateway entity 904, which provides connectivity between data center network 900 and one or more further networks 906. In some embodiments, border gateway entity 904 may comprise a border router which is responsible for routing data traffic within the data center switching fabric 902. In embodiments, the one or more further networks 906 may comprise the public internet. In further embodiments, the one or more further networks 906 may comprise one or more other data center networks which form a distributed data center deployment. In some such embodiments, the one or more other data center networks are accessible via an inter-data center backbone.

In embodiments, the IP addresses of the virtual systems 102a, 104a, 102b, 104b in data center network 900 are routable, i.e. unique, within data center network 900. In some embodiments, the IP addresses of one or more of the virtual systems 102a, 104a, 102b, 104b in data center network 900 are publicly routable, which is to say that they are unique within the public Internet (accessible via border gateway entity 904) as well as within data center network 900.

As described above in relation to FIG. 1, the packet forwarding functions 106a, 106b may be configured with different IP addresses with respect to the external network (i.e. data center switching fabric 902) versus their respective internal networks (i.e. the network comprised within the respective server 100a, 100b which includes the virtual systems hosted on that server). In some embodiments, the packet forwarding functions 106a, 106b may be configured with IP addresses in the external network that are unique within the data center switching fabric 902. However, in some embodiments, the various packet forwarding functions 106a, 106b in the data center network may be configured with the same IP addresses in their respective internal networks. In such embodiments, the various virtual systems in the data center network communicate via a packet forwarding function 106a, 106b, which appears to have the same IP address. This enables virtual systems 102a, 104a, 102b, 104b, to be more easily moved between the various host servers 100a, 100b in the data center network. As the internal networks comprised within various host servers 100a, 100b in the data center network appear effectively the same to hosted virtual systems (i.e. the packet forwarding functions have the same IP addresses, which are also the default route in the respective internal networks) virtual systems can be moved between the various host servers without requiring extensive reconfiguration.

In some embodiments, the IP addresses of packet forwarding functions 106a, 106b in the external network (i.e. data center switching fabric 902) are advertised in the external network as the default next hop IP address for reaching the one or more virtual systems 102a, 104a, 102b, 104b hosted on the respective server 100. Hence, the IP addresses of packet forwarding functions 106a, 106b in the external network are advertised in the external network as the default next hop IP address for data packets being routed to the associated virtual systems.

In some embodiments, the packet forwarding functions 106a, 106 also have the same MAC addresses in their respective internal networks, thereby further reducing the reconfiguration required when moving virtual systems between the various host servers 100a, 100b in the data center network. In such systems, the packet forwarding functions have unique MAC addresses in the external network (i.e. data center switching fabric 902) in order to ensure that they are uniquely routable within the external network. Therefore, in such embodiments, the MAC address of a given packet forwarding function in the external network is different to its MAC address in its respective internal network.

Returning to FIG. 1, in some embodiments, measures are provided to establish connectivity between packet forwarding function 106 and the virtual systems 102, 104 hosted on server 100, by establishing the necessary virtual connection 108, 110 and populating entries in packet forwarding data store 118. In some embodiments, these measures are provided in the form of connectivity component 122 comprised within server 100. In embodiments where a software tool such as OpenStack is provided for managing the setup of virtual systems 102, 104 on server 100, connectivity component 122 may be provided in the form of a plugin for the software tool. In alternative embodiments, connectivity component 122 may comprise a background process, such as a Linux daemon, running on server 100. In yet further embodiments, the functions of connectivity component 122 are comprised within packet forwarding function 106.

Depending on the implementation of the connectivity component 122, the connectivity component may be notified of the setup of a new virtual system on server 100 in various ways. Server 100 may comprise an orchestrator component 124, such as the orchestrator provided within OpenStack or the 'Flynn' orchestrator used in Linux Containers, for managing the setup of virtual systems 102, 104 on server 100. In some embodiments, the orchestrator component 124 is configured to notify connectivity component 122 when a virtual system 102, 104, is setup on server 100. In such embodiments, the connectivity component 122 may subscribe to notifications from orchestrator component 124. In alternative embodiments, connectivity component 122 may monitor server 100 to determine when setup of a virtual system occurs.

Figure 10:
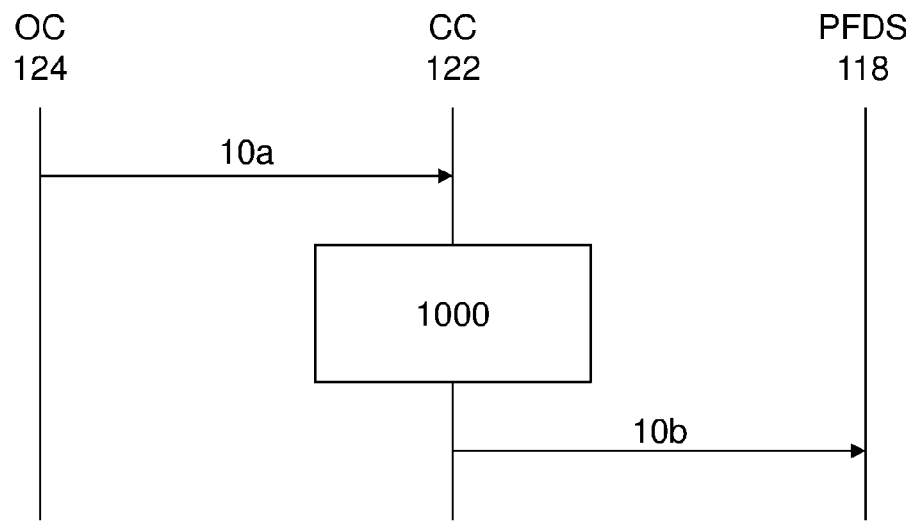
FIG. 10 illustrates a message flow for a connectivity process according to one or more disclosed embodiments.

FIG. 10 illustrates a message flow for a connectivity process according to embodiments. Initially, setup notification 10a, which relates to setup of a virtual system on server 100, is received by connectivity component 122. In this case, setup notification 10a relates to setup of virtual system 102. In the depicted embodiments, setup notification 10a is sent by the orchestrator component 124. In alternative embodiments, setup notification 10a may result from monitoring performed by connectivity component 122. In response to receipt of setup notification 10a, connectivity component 122 is configured to create virtual connection 108 between virtual system 102 and packet forwarding function 106 at step 1000. Further in response to receipt of setup notification 10a, connectivity component 122 is configured to populate an entry in packet forwarding data store 118 comprised within server 100 by sending data entry update message 10b. The entry in packet forwarding data store 118 may comprise the IP address of virtual system 102, and an identifier for the virtual connection 108 which connects virtual system 102 to packet forwarding function 106. In some embodiments, the identifier for virtual connection 108 may comprise an identifier for virtual interface 112.

In some embodiments, the setup of the virtual connection at step 1000 may comprise setting up a virtual interface 112 in packet forwarding function 106 via which the virtual connection 108 between the packet forwarding function and virtual system 102 is established. In such embodiments, virtual connection 108 may comprise virtual interface 112. In embodiments, virtual interface 112 may comprise a virtual Ethernet port (veth). In further embodiments, virtual interface 112 may comprise a network tunnel (tun). In yet further embodiments, virtual interface 112 may comprise a network tunnel (tap).

In embodiments, setup notification 10a may comprise the IP address of virtual system 102, which is then used to populate the entry in packet forwarding data store 118. In alternative embodiments, setup notification 10a may comprise an identifier for virtual system 102, which can be resolved into an IP address for virtual system 102 by connectivity component 122. In some such embodiments, connectivity component 122 may allocate an IP address to virtual system 102. In some embodiments, the identifier for the virtual system may influence the choice of IP address allocated by connectivity component 122. For example, the identifier may indicate that the virtual system belongs to a particular tenant, or performs a particular function, and therefore should be allocated an available IP address from a particular range.

In some embodiments, connectivity component 122 may be further configured to populate entries in address translation data store 120 in response to setup of a virtual system 102, 104 on server 100.

Figure 11:
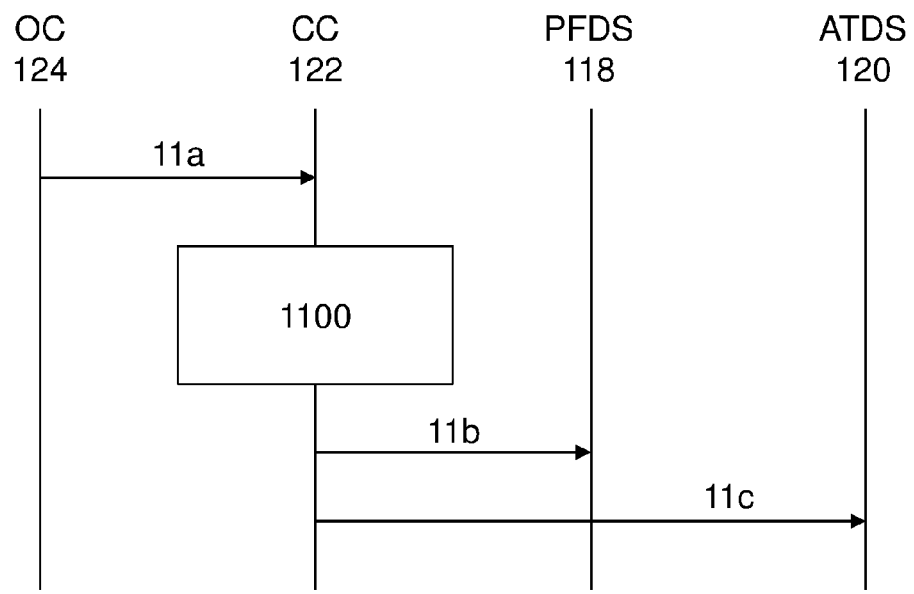
FIG. 11 illustrates a message flow for a connectivity process according to one or more disclosed embodiments.

FIG. 11 illustrates a message flow for a connectivity process according to embodiments. Initially, setup notification 11a, which relates to setup of virtual system 102 on server 100, is received by connectivity component 122. Again, in the depicted embodiments, setup notification 11a is sent by the orchestrator component 124. In response to receipt of setup notification 11a, connectivity component 122 may be configured to create virtual connection 108 between virtual system 102 and packet forwarding function 106 at step 1100. In response to receipt of setup notification 11a, connectivity component 122 may also be configured to populate an entry in packet forwarding data store 118 that may be comprised within server 100 by sending data entry update message 11b to the packet forwarding data store, as described above in relation to FIG. 10. Further in response to receipt of setup notification 11a, connectivity component 122 may be configured to populate an entry in address translation data store 120 comprised within server 100 by sending data entry update message 11c to address translation data store 120. The entry in address translation data store 120 may comprise the IP address of virtual system 102 and the MAC address of virtual system 102.

The IP address of virtual system 102 for use in populating the entry in address translation data store 120 may be determined as detailed above in relation to packet forwarding data store 118. In embodiments, setup notification 11a may comprise the MAC address of virtual system 102, which is then used to populate the entry in address translation data store 120. In alternative embodiments, setup notification 11a may comprise an identifier for virtual system 102, which can be resolved into a MAC address for virtual system 102 by connectivity component 122.

In embodiments, the step of creating the virtual connection 1000, 1100 may further comprise binding the generated connection to a network interface of the virtual system 102, 104. In some embodiments, the step of creating the virtual connection 1000, 1100 may comprise configuring one or more guest network scripts on the virtual system 102, 104.

In some embodiments, connectivity component 122 is further responsive to closure of virtual systems 102, 104 on server 100, in order to remove the previously created connections 108, 110 and delete the previously populated entries in the packet forwarding data store 118 and/or the address translation data store 120. In such embodiments, connectivity component 122 is notified through receipt of a closure notification when closure of a virtual system 102, 104 on server 100 occurs. Again, such closure notifications may be received from an orchestrator component 124, or may result from monitoring performed by connectivity component 122.

Figure 12:
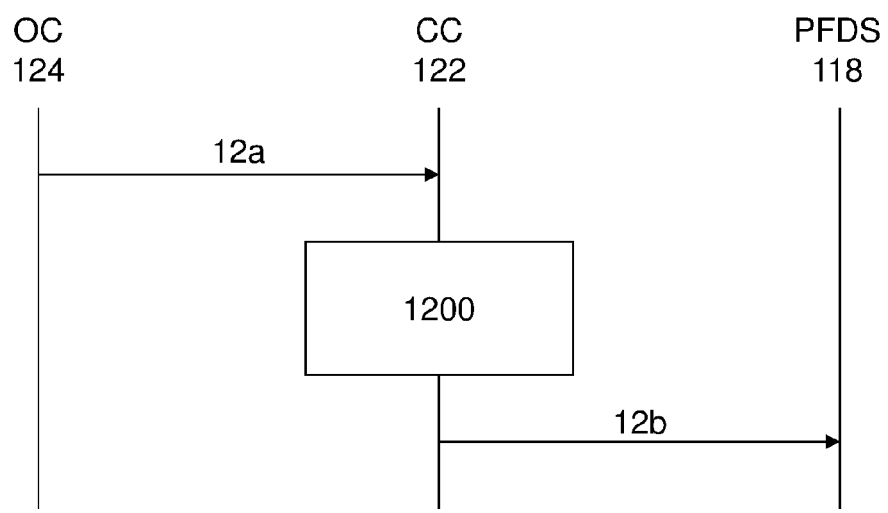
FIG. 12 illustrates a message flow for a connectivity process according to one or more disclosed embodiments.

FIG. 12 illustrates a message flow for a connectivity process according to embodiments. Initially, closure notification 12a, which relates to closure of a virtual system on server 100, is received by connectivity component 122. In this case, closure notification 12a relates to closure of virtual system 102. In the depicted embodiments, closure notification 12a is sent by the orchestrator component 124. In alternative embodiments, closure notification 12a may result from monitoring performed by connectivity component 122. In response to receipt of closure notification 12a, connectivity component 122 is configured to remove virtual connection 108 at step 1200. Further in response to receipt of closure notification 12a, connectivity component 122 is configured to delete the entry in packet forwarding data store 118 which may comprise the IP address of virtual system 102 and an identifier for virtual connection 108, by sending data entry update message 12b.

In some embodiments, connectivity component 122 may be further configured to delete entries in address translation data store 120 in response to closure of a virtual system 102, 104 on server 100.

Figure 13:
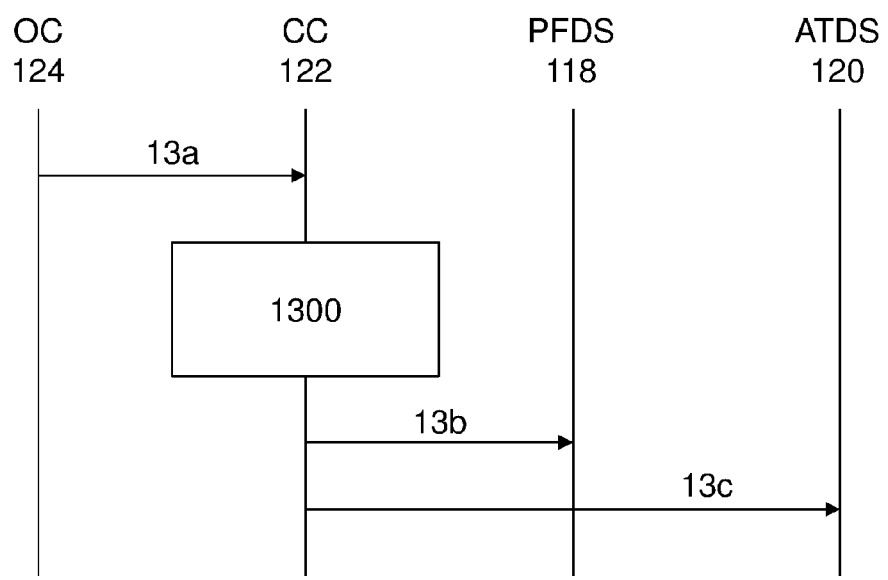
FIG. 13 illustrates a message flow for a connectivity process according to one or more disclosed embodiments.

FIG. 13 illustrates a message flow for a connectivity process according to embodiments. Initially, closure notification 13a, which relates to closure of virtual system 102 on server 100, is received by connectivity component 122. Again, in the depicted embodiments, closure notification 13a is sent by the orchestrator component 124. In response to receipt of closure notification 13a, connectivity component 122 may be configured to remove virtual connection 108 at step 1300. In response to receipt of closure notification 13a, connectivity component 122 may also be configured to delete the entry in packet forwarding data store 118 comprised within server 100 by sending data entry update message 13b to packet forwarding data store 118, as described above in relation to FIG. 12. Further in response to receipt of closure notification 13a, connectivity component 122 may be configured to delete the entry in address translation data store 120 which may comprise the IP address and MAC address of virtual system 102, by sending data entry update message 11c to address translation data store 120.

In some embodiments, connectivity component 122 is configured to distribute packet forwarding information for virtual systems 102, 104 hosted on server 100 to one or more entities outside of server 100. For example, in response to setup and/or closure of a virtual system 102, 104 on server 100, connectivity component 122 may transmit a packet forwarding update message via physical network interface 116 to one or more entities in the data center network. In embodiments, the packet forwarding update message is transmitted in response to receipt of a setup notification and/or receipt of a closure notification received in relation to a virtual system 102, 104 hosted on server 100. In some embodiments, the packet forwarding update message may comprise the IP address of that virtual system 102, 104 as well as the IP address of server 100. Server 100 may thus be configured by recipients of the packet forwarding update message as the next hop IP address in the data center network to be used for reaching that virtual system 102, 104.

In some arrangements, connectivity component 122 is configured to transmit packet forwarding update messages to one or more other servers in the data center network. When such an update message is received by one of the one or more other servers in the data center network, a connectivity component running on that server can use the received packet forwarding update message to populate an entry in a forwarding data store on that server. In some embodiments, the entry may comprise the IP address of the virtual system 102, 104 and lists the IP address of server 100 as the next hop IP address to be used for routing to that virtual system.

In alternative embodiments, connectivity component 122 is configured to transmit packet forwarding update messages to a route reflector 908 depicted in FIG. 9. Route reflector 908 is configured to receive packet forwarding update messages from servers in the data center network, and retransmit the packet forwarding update message to the other servers in the data center network. In this manner, the connectivity components do not need to keep track of all of the servers located in the data center network in order to transmit packet forwarding update messages to them, as the distribution of packet forwarding update messages is handled by route reflector 908.

In the depicted embodiments, route reflector 908 is depicted as a distinct entity in the data center network, in alternative embodiments, the route reflector may be comprised within another entity in the data center network, such as border gateway entity 904. In embodiments where connectivity component 122 transmits packet forwarding update messages to a route reflector, connectivity component 122 may be considered to act as a route reflector client. In yet further embodiments, server 100 may comprise route reflector client 126, which is configured to monitor packet forwarding data store. In such embodiments, in response to detecting a change in the entries in the packet forwarding data store, route reflector client 126 may be configured to transmit a packet forwarding update message to route reflector 908.

In some embodiments, the packet forwarding update messages are border gateway protocol (BGP) messages. In some such embodiments, the packet forwarding update messages comprise BGP UPDATE messages.

In some embodiments, in response to receipt of a packet forwarding update message received via physical network interface 116 from an entity outside of server 100, connectivity component 122 may be configured to modify one or more entries in packet forwarding data store 118. If the received packet forwarding update message relates to setup of a virtual system on another server in the data center network, connectivity component 122 may be configured to populate an entry in packet forwarding data store 118 which may comprise the IP address of that virtual system and lists the IP address of the server on which it is hosted as the next hop IP address for reaching that virtual system. However, if the received packet forwarding update message relates to closure of a virtual system on another server in the data center network, connectivity component 122 may be configured to delete the entry in packet forwarding data store 118 which may comprise the IP address of that virtual system and the IP address of the server on which it is hosted. In some embodiments, the received packet forwarding update message may comprise the IP address of that virtual system and the IP address of the server on which it is hosted.

In embodiments where server 100 may comprise route reflector client 126, the route reflector client may be responsible for modifying the entries in the packet forwarding data store instead of connectivity component 122.

Returning again to FIG. 1, in some embodiments, measures are provided to control communication access between virtual systems in the data center network. In some embodiments, these measures are provided in the form of access control data store 128. In embodiments, access control data store 128 is comprised within server 100. Access control data store 128 may comprise entries which comprise IP addresses which are allowed to communicate with each other in the data center network. In some embodiments, access control data store 128 may comprise an access control list (ACL). According to embodiments, access control data store 128 is accessed by packet forwarding function 106 for use in making forwarding decisions for received data packets.

In some embodiments, access control data store 128 acts as a whitelist for allowed combinations of IP addresses. In such embodiments, packet forwarding function 106 is configured to only forward data packets that are may be routed from a particular source IP address to a particular destination IP address if that combination of IP addresses is listed in an entry in access control data store 128. In such embodiments, if the combination of source and destination IP addresses is listed in access control data store 128, then the data packet is forwarded as described previously in relation to any of FIGS. 2 to 8. However, if the combination of source and destination IP addresses is not listed in an entry in access control data store 128, the packet forwarding function 106 is configured to drop the data packet (i.e. not forward it on).

In alternative embodiments, access control data store 128 acts as a blacklist for restricted combinations of IP addresses. Under such embodiments, packet forwarding function 106 is configured to only forward data packets that may be routed from a particular source IP address to a particular destination IP address if that combination of IP addresses is not listed in an entry in access control data store 128. In such embodiments, if the combination of source and destination IP addresses is not listed in access control data store 128, then the data packet is forwarded as described previously in relation to any of FIGS. 2 to 8. However, if the combination of source and destination IP addresses is listed in an entry in access control data store 128, the packet forwarding function 106 is configured to drop the data packet (i.e. not forward it on).

In some embodiments, one or more of the entries in access control data store 128 comprise a range of IP addresses. In this manner, several virtual systems that are allowed to communicate (or are restricted from communicating) can be defined. Further, if new virtual systems that are added to that group are allocated an IP address in the listed range, then communication between the new and existing virtual systems in the group is allowed (or restricted) without having to update the access control data store 128 with new individual entries.

In some embodiments, one or more of the entries in access control data store 128 comprise protocol identifiers alongside the listed IP addresses and or IP address ranges. In such embodiments, the protocol identifiers specify particular protocols, applications or services which the listed IP addresses are allowed to use (or are restricted from using) to communicate. In some embodiments, the protocol identifiers comprise IP port numbers. In some such embodiments access control data store 128 acts as a whitelist for allowed combinations of IP addresses and applications. In alternative such embodiments, access control data store 128 acts as a blacklist for restricted combinations of IP addresses and applications.

Figure 14:
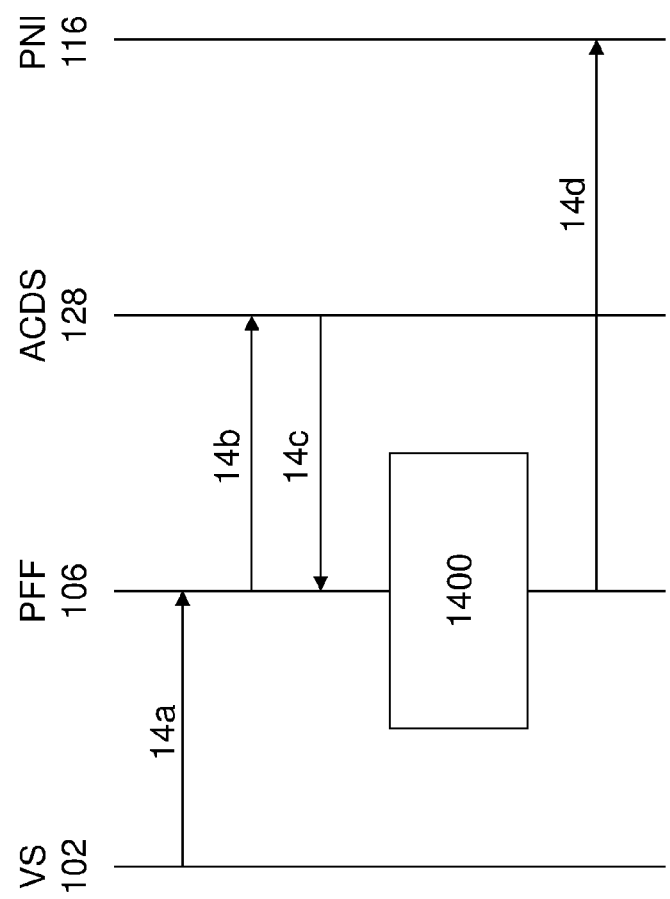
FIG. 14 illustrates a message flow for a packet forwarding process according to one or more disclosed embodiments.

FIG. 14 illustrates a message flow for a packet forwarding process according to embodiments. Initially, data packet 14a is received at packet forwarding function 106 from virtual system 102 (for example as a result of the default route configuration described previously). In response to receipt of data packet 14a, packet forwarding function 106 may be configured to query access control data store 128 in relation to the source and destination IP addresses of received data packet 14a, through data store query 14b and corresponding data store response 14c. On the basis of the information comprised within data store response 14c, packet forwarding function 106 may be configured to make a forwarding decision for the received data packet at step 1400. In this case, data store response 14c indicates that communication between the specified source and destination IP addresses is allowed (either because there is a corresponding entry in access control data store 128 in the case of whitelist operation, or because there is no corresponding entry in access control data store 128 in the case of blacklist operation). Therefore, packet forwarding function 106 makes a forwarding decision to forward the data packet on, for example as described previously in relation to any of FIGS. 2 to 8, via physical network interface 116 to a destination located outside of server 100, as forwarded data packet 14d.

Figure 15:
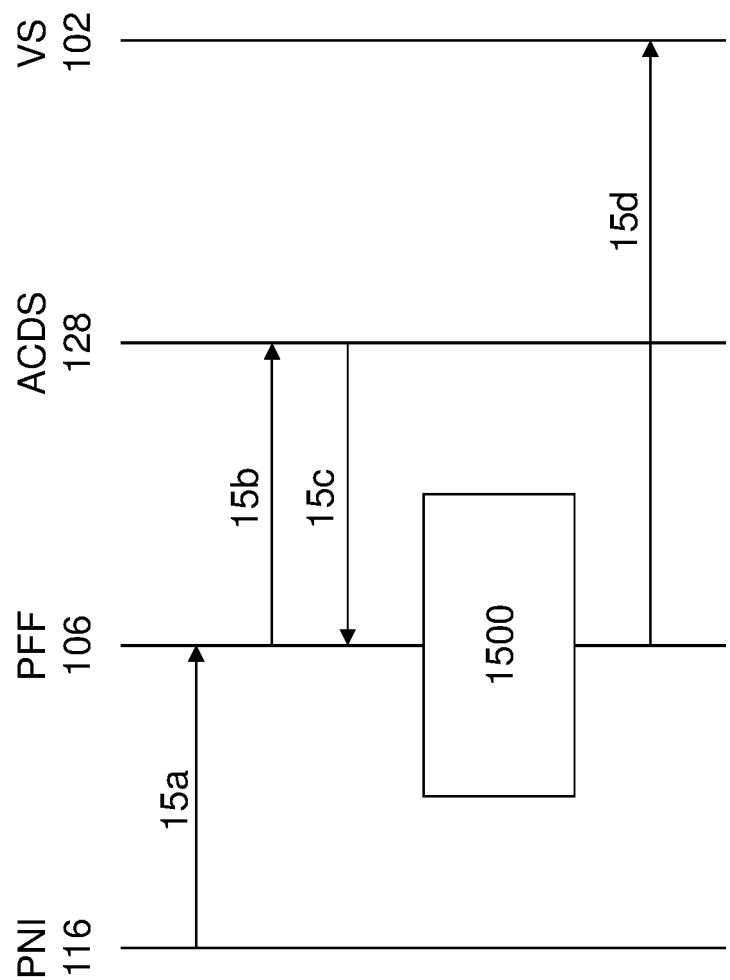
FIG. 15 illustrates a message flow for a packet forwarding process according to one or more disclosed embodiments.

FIG. 15 illustrates a message flow for a packet forwarding process according to embodiments. Initially, data packet 15a is received at packet forwarding function 106 via physical network interface 116 from a source located outside of server 100. In response to receipt of data packet 15a, packet forwarding function 106 may be configured to query access control data store 128 in relation to the source and destination IP addresses of received data packet 15a, through data store query 15b and corresponding data store response 15c. On the basis of the information comprised within data store response 15c, packet forwarding function 106 may be configured to make a forwarding decision for the received data packet at step 1500. In this case, data store response 15c indicates that communication between the specified source and destination IP addresses is allowed (either because there is a corresponding entry in access control data store 128 in the case of whitelist operation, or because there is no corresponding entry in access control data store 128 in the case of blacklist operation). Therefore, packet forwarding function 106 makes a forwarding decision to forward the data packet on, for example as described previously in relation to any of FIGS. 2 to 8, to virtual system 102 as forwarded data packet 15d.

The access control measures provided by access control data store 128 are scalable to support arbitrarily large numbers of virtual systems in the data center network, and are not limited by the number of available virtual LANs for example, as is the case in many conventional systems. Further, as can be seen from FIGS. 14 and 15, for traffic that is routed between virtual systems hosted on two different servers in the data center network, security is enforced at both the server that hosts the source virtual system and the server that hosts the destination virtual system. This duplication of security functions at both ingress and egress of the data center switching fabric provides increased resilience against any errors that may occur at either server.

While in the embodiments depicted in FIG. 1 access control data store 128 is comprised within server 100, in alternative embodiments, access control data store 128 is comprised outside of server 100, and is accessible to one or more servers in the data center network.

Returning again to FIG. 1, in some embodiments, measures are provided to populate and maintain the entries comprised in access control data store 128. In some embodiments, these measures are provided in the form of security component 130 comprised within server 100. In embodiments where a software tool is provided for managing the setup of virtual systems 102, 104 on server 100, security component 130 may be provided in the form of a plugin for the software tool. In alternative embodiments, connectivity component 122 may comprise a background process, such as a Linux daemon, running on server 100. In yet further embodiments, the functions of connectivity component 122 are comprised within packet forwarding function 106.

In some embodiments, security component 130 is responsive to setup of a new virtual system 102, 104 on server 100. In a manner similar to as described previously in relation to connectivity component 122, security component 130 may be notified of the setup of a new virtual system 102, 104 on server 100 by orchestrator component 124, or alternatively security component 130 may monitor server 100 to determine when setup of a virtual system occurs.

Figure 16:
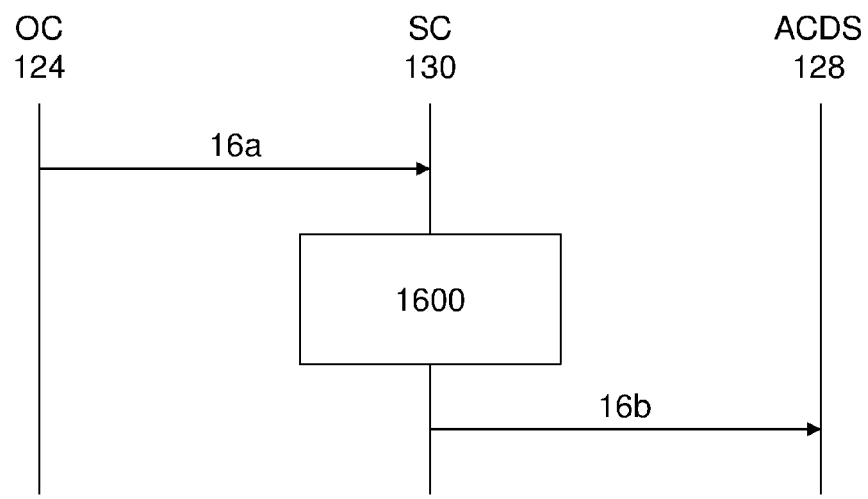
FIG. 16 illustrates a message flow for an access control process according to one or more disclosed embodiments.

FIG. 16 illustrates a message flow for an access control process according to embodiments. Initially, setup notification 16a, which relates to setup of a virtual system on server 100, is received by security component 130. In this case, setup notification 16a relates to setup of virtual system 102. In the depicted embodiments, setup notification 16a is sent by the orchestrator component 124. In alternative embodiments, setup notification 16a may result from monitoring performed by security component 130. In response to receipt of setup notification 16a, security component 130 is configured to determine, at step 1600, one or more entries to populate in access control data store 128. Security component 130 is then configured to populate the determined one or more entries in access control data store 128 by sending data entry update message 16b. The entry in packet forwarding data store 118 may comprise at least the IP address of virtual system 102, as well as the IP address or IP address range for the one or more communication endpoints (such as other virtual systems in the data center network) with which communication is allowed (or restricted).

In some embodiments, setup notification 16a may comprise the IP address of virtual system 102, which is then used to populate the one or more entries in access control data store 128. In alternative embodiments, setup notification 16a may comprise an identifier for virtual system 102, which can be resolved into an IP address for virtual system 102 by security component 122. In embodiments, setup notification 16a also may comprise the IP address or IP address range for the one or more communication endpoints with which communication is allowed (or restricted), which is then used to populate the one or more entries in access control data store 128. In alternative embodiments, setup notification 16a may comprise an identifier for the one or more communication endpoints, which can be resolved or mapped to an IP address or IP address range for the one or more communication endpoints by security component 130. In some embodiments, the determination, at step 1600, of the one or more entries to populate in access control data store 128 may comprise conversion of the various identifiers received in setup notification 16a into the necessary entries for populating in access control data store 128.

In some embodiments, security component 130 is further responsive to closure of virtual systems 102, 104 on server 100, in order to delete the previously populated entries in the access control data store 128. In such embodiments, security component 130 is notified through receipt of a closure notification when closure of a virtual system 102, 104 on server 100 occurs. Again, such closure notifications may be received from an orchestrator component 124, or may result from monitoring performed by security component 130.

Figure 17:
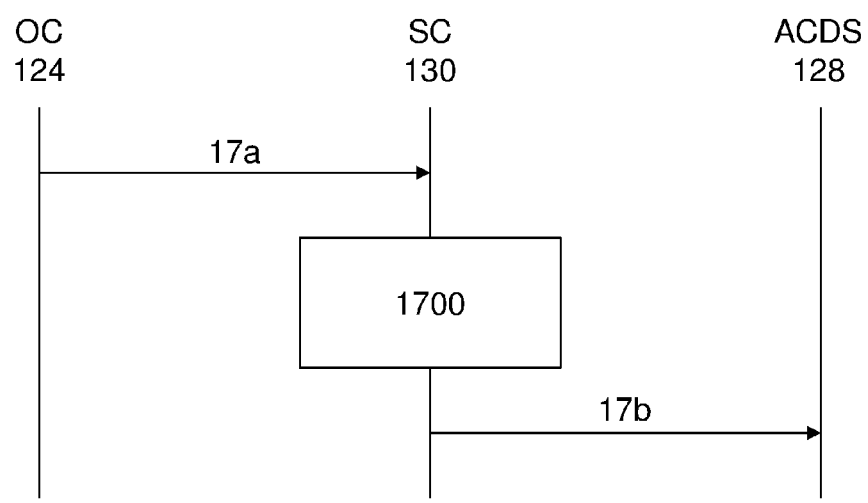
FIG. 17 illustrates a message flow for an access control process according to one or more disclosed embodiments.

FIG. 17 illustrates a message flow for an access control process according to embodiments. Initially, closure notification 17a, which relates to closure of a virtual system on server 100, is received by security component 130. In this case, closure notification 17a relates to closure of virtual system 102. In the depicted embodiments, closure notification 17a is sent by the orchestrator component 124. In alternative embodiments, closure notification 17a may result from monitoring performed by security component 130. In response to receipt of closure notification 17a, security component 130 may be configured to determine, at step 1700, one or more entries in access control data store 128 which require deletion. Security component 130 is then configured to delete the determined one or more entries in access control data store 128 by sending data entry update message 17b.

In embodiments, apparatus 100 may comprise a processor or processing system, as depicted by processor 132 in FIG. 1. In embodiments, the processing system may comprise one or more processors and/or memory. Each device as described in relation to any of the embodiments described above may similarly comprise a processor and/or processing system. One or more of the embodiments described herein with reference to the drawings comprise processes performed by apparatus 100. In some embodiments, apparatus 100 may comprise one or more processing systems or processors configured to carry out these processes. In this regard, some embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples of the invention. Further embodiments of the invention are envisioned. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of establishing connectivity in a data center network, the method comprising:
   creating a virtual connection between a virtual system hosted on a server in the data center network and a packet forwarding function comprised within the server;
   populating an entry in a packet forwarding data store comprised within the server, the entry comprising an internet protocol (IP) address of the virtual system and an associated identifier for the created virtual connection, wherein the packet forwarding data store is accessed by the packet forwarding function when making forwarding decisions for received data packets; and monitoring the server and removing the created virtual connection between the virtual system hosted on the server in the data center network and the packet forwarding function comprised within the server based on the monitoring.

2. The method of claim 1, wherein the packet forwarding data store comprises a forwarding table.

3. The method of claim 1, further comprising:
prior to creating the virtual network connection, receiving a setup notification relating to setup of a virtual system on the server,
wherein the virtual connection is created in response to receipt of the setup notification.

4. The method of claim 3, wherein the setup notification includes the IP address of the virtual system.

5. The method of claim 3, wherein the setup notification includes an identifier for the virtual system.

6. The method of claim 1, wherein the virtual connection comprises one or more of:
a virtual Ethernet connection,
a network tunnel, and
a network tap.

7. The method of claim 1, further comprising populating an entry in an address translation data store comprised within the server, wherein the entry comprises the IP address of the virtual system and the media access control (MAC) address of the virtual system.

8. The method of claim 7, wherein the setup notification comprises the MAC address of the virtual system.

9. The method of claim 7, wherein the address translation data store comprises at least one of an Address Resolution Protocol (ARP) cache or a Neighbor Discovery (ND) cache.

10. The method of claim 1, wherein the packet forwarding data store comprises a forwarding information base (FIB).

11. The method of claim 1, wherein the server comprises a physical network interface, and wherein the packet forwarding function is configured to forward data packets between the virtual system and the physical network interface.

12. The method of claim 11, wherein the packet forwarding function connects a first network which is reachable via the physical network interface of the server, to a second, different network which includes at least the virtual system.

13. The method of claim 12, wherein the second network is a virtualized network comprised within the server, the second network including one or more virtual systems hosted on the server.

14. The method of claim 12, wherein the packet forwarding function has a first IP address in the first network, and a second, different IP address in the second network.

15. The method of claim 14, further comprising transmitting a packet forwarding update message to one or more further servers in the data center network via the physical network interface, the packet forwarding update message relating to setup of the virtual system on the server, wherein the transmitted packet forwarding update message comprises the IP address of the virtual system and the first IP address of the packet forwarding function.

16. The method of claim 15, wherein the transmitted packet forwarding update message comprises a border gateway protocol (BGP) UPDATE message.

17. The method of claim 15, wherein the one or more further servers comprise one or more further virtual systems.

18. The method of claim 15, wherein the one or more further servers comprise a BGP route reflector.

19. The method of claim 1, further comprising:
receiving a closure notification relating to closure of the virtual system on the server;
removing the virtual connection between the virtual system and the packet forwarding function in response to receipt of the closure notification; and
deleting the entry from the packet forwarding data store.

20. The method of claim 19, further comprising transmitting a packet forwarding update message to one or more further servers in the data center network in response to receipt of the closure notification, the transmitted packet forwarding update message relating to closure of the virtual system on the server.

21. The method of claim 20, wherein the transmitted packet forwarding update message comprises a border gateway protocol (BGP) UPDATE message.

22. The method of claim 20, wherein the one or more further servers comprise one or more further virtual systems.

23. The method of claim 20, wherein the one or more further servers comprise a BGP route reflector.

24. The method of claim 11 further comprising:
receiving a packet forwarding update message via the physical network interface on the server, the received packet forwarding update message relating to a further virtual system comprised within a further server in the data center network; and
modifying one or more further entries in the packet forwarding data store on the basis of the received packet forwarding update message.

25. The method of claim 24, wherein the received packet forwarding update message relates to setup of the further virtual system on the further server, and wherein modification of the one or more further entries in the packet forwarding data store comprises populating at least one entry in the packet forwarding data store, the at least one entry comprising an IP address of the further virtual system and an IP address of the further server.

26. The method of claim 25, wherein the received packet forwarding update message comprises the IP address of the further virtual system and the IP address of the further server.

27. The method of claim 24, wherein the received packet forwarding update message relates to closure of the further virtual system on the further server, and wherein modification of the one or more further entries in the packet forwarding data store comprises deleting at least one entry from the packet forwarding data store, the at least one entry comprising an IP address of the further virtual system and an IP address of the further server.

28. The method of claim 27, wherein the received packet forwarding update message comprises the IP address of the further virtual system and the IP address of the further server.

29. The method of claim 1, further comprising:
receiving, at the packet forwarding function, a data packet being routed to or from the virtual system;
querying the packet forwarding data store in relation to a destination IP address of the received data packet; and
forwarding the data packet at least on the basis of a result of the query.

30. The method of claim 1 wherein the virtual system comprises a virtual machine.

31. The method of claim 1, wherein the virtual system comprises a Linux container.

32. The method of claim 1, wherein the creating and populating steps are carried out by a connectivity component comprised within the server.

33. The method of claim 32, wherein the connectivity component comprises an OpenStack™ plugin.

34. A system for use in a data center network, the system comprising at least one processor, and at least one memory including computer program code, the at least one memory and the computer program code being configured to, with the at least one processor, cause the system to:
- create a virtual connection between a virtual system hosted on a server in the data center network and a packet forwarding function comprised within the server;
- populate an entry in a packet forwarding data store comprised within the server, the entry comprising an internet protocol (IP) address of the virtual system and an associated identifier for the created virtual connection, wherein the packet forwarding data store is accessed by the packet forwarding function when making forwarding decisions for received data packets; and
- monitor the server and remove the created virtual connection between the virtual system hosted on the server in the data center network and the packet forwarding function comprised within the server based on the monitoring.

35. A non-transitory computer-readable storage medium having computer-executable instructions stored thereon, which, when executed by a processor cause a computing device to perform a method for routing data packets in a data center network, the method comprising:
- creating a virtual connection between a virtual system hosted on a server in the data center network and a packet forwarding function comprised within the server;
- populating an entry in a packet forwarding data store comprised within the server, the entry comprising an internet protocol (IP) address of the virtual system and an associated identifier for the created virtual connection, wherein the packet forwarding data store is accessed by the packet forwarding function when making forwarding decisions for received data packets; and
- monitoring the server and removing the created virtual connection between the virtual system hosted on the server in the data center network and the packet forwarding function comprised within the server based on the monitoring.

\* \* \* \* \*